US012705305B2

(12) United States Patent
Pailla et al.

(10) Patent No.: US 12,705,305 B2
(45) Date of Patent: Aug. 11, 2026

(54) SYSTEM AND METHOD FOR MULTI ATTRIBUTE BASED DATA SYNTHESIS

(71) Applicant: Jio Platforms Limited, Ahmedabad (IN)

(72) Inventors: Balakrishna Pailla, Alto Porvarim (IN); Naveen Kumar Pandey, Pratapgarh (IN); Shubham Bhardwaj, Medak (IN); Raghav Gupta, Jaipur (IN); Indu Cherukuri, Malakapalli (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 387 days.

(21) Appl. No.: 18/173,296

(22) Filed: Feb. 23, 2023

(65) Prior Publication Data

US 2023/0274563 A1 Aug. 31, 2023

(30) Foreign Application Priority Data

Feb. 28, 2022 (IN) ............................. 202221010927

(51) Int. Cl.

| | |
|---|---|
| ***G06V 20/70*** | (2022.01) |
| ***G06Q 30/0601*** | (2023.01) |
| ***G06T 7/194*** | (2017.01) |
| ***G06T 7/60*** | (2017.01) |
| ***G06T 7/70*** | (2017.01) |
| ***G06T 11/60*** | (2026.01) |
| ***G06V 10/26*** | (2022.01) |
| ***G06V 40/16*** | (2022.01) |

(52) U.S. Cl.

CPC .............. *G06V 20/70* (2022.01); *G06T 7/194* (2017.01); *G06T 7/60* (2013.01); *G06T 7/70* (2017.01); *G06T 11/60* (2013.01); *G06V 10/267* (2022.01); *G06V 40/161* (2022.01); *G06Q 30/0643* (2013.01); *G06T 2207/20021* (2013.01); *G06T 2207/20081* (2013.01); *G06T 2207/30196* (2013.01); *G06T 2210/16* (2013.01)

(58) Field of Classification Search

USPC .......................................................... 382/180

See application file for complete search history.

(56) References Cited

U.S. PATENT DOCUMENTS

| | | | | |
|---|---|---|---|---|
| 2012/0219209 | A1* | 8/2012 | Shotton .................. | G06V 10/32 382/159 |
| 2016/0284018 | A1* | 9/2016 | Adeyoola .......... | G06Q 30/0643 |
| 2017/0262959 | A1* | 9/2017 | Lee ..................... | G06F 3/04845 |
| 2017/0352092 | A1* | 12/2017 | Mitchell ............... | G06T 15/503 |
| 2019/0213388 | A1* | 7/2019 | Makeev ................. | G06V 10/82 |

(Continued)

*Primary Examiner* — Chineyere Wills-Burns
*Assistant Examiner* — Aaron Timothy Bonansinga
(74) *Attorney, Agent, or Firm* — FINNEGAN, HENDERSON, FARABOW, GARRETT & DUNNER LLP

(57) ABSTRACT

The present invention provides a system and method to create a multi attribute based data synthesis. The method includes obtaining an input image, where the input image includes a human wearing an apparel in a foreground and a scene in a background, detecting the human in the input image, detecting a face region of the human in the input image, generating a body-ratio-heuristics for the input image, generating a set of mask labels associated with the input image, and performing a domain randomization of the input image to generate a plurality of images to create the image database.

7 Claims, 5 Drawing Sheets

(56) References Cited

U.S. PATENT DOCUMENTS

| | | | | |
|---|---|---|---|---|
| 2019/0333267 | A1* | 10/2019 | Black | G06F 18/2321 |
| 2019/0355150 | A1* | 11/2019 | Tremblay | G06N 3/08 |
| 2022/0044010 | A1* | 2/2022 | Li | G06V 40/10 |
| 2022/0044441 | A1* | 2/2022 | Kalra | G06V 10/82 |
| 2022/0203548 | A1* | 6/2022 | De Gregorio | G06T 7/70 |

* cited by examiner

SYSTEM AND METHOD FOR MULTI ATTRIBUTE BASED DATA SYNTHESIS

FIELD OF INVENTION

The present disclosure relates to a method and a system for providing computer vision assisted fashion model synthesis, and more particularly, to method and system for providing computer vision assisted apparel model generating high-quality, photorealistic, large-scale domain-specific cloth type synthetics.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Creating synthetic data for fashion sub-field allows improving the search experience of users on e-commerce website to make more informed decisions about the choice of apparel they are buying thereby reducing return of items. Including cloth type tags improves the user-experience of the e-commerce website. A good user-experience is a fundamental guiding metric that decides user retention.

Identification of type of cloth finds its application in multiple e-commerce use-cases, for example, shortlisting of tops or shirts based on style/pattern/fit. Traditionally, expert annotators manually add tags for each garment. However, at times these annotators create sparsely labelled error prone tags for a particular type of cloth. With changing fashion, the type of tags change. Old garments need to be updated along with the new arrivals. In the Indian clothing scenario, the clothing is diverse with no official datasets readily available. Hence, there is a need to augment the existing imbalanced sparsely labelled error prone dataset with high quality labelled data.

Therefore, there is a need in the art to provide a system and a method that can mitigate the problems associated with the prior art and provide with a computer vision assisted workflow for enabling entities to scale annotation of cloth apparels in a fast and efficient manner with minimal supervision.

SUMMARY

This section is provided to introduce certain objects and aspects of the present disclosure in a simplified form that are further described below in the detailed description. This summary is not intended to identify the key features or the scope of the claimed subject matter.

In one aspect, the present disclosure relates to a system for creating a multi attribute based data synthesis. The system includes one or more processors and a memory operatively coupled to the one or more processors, where the memory includes processor-executable instructions, which on execution, cause the one or more processors to obtain an input image from a database, where the image includes a foreground and a background, perform a coarse segmentation of the input image to obtain a set of mask labels, annotate the set of mask labels to differentiate the foreground from the background, and create a plurality of images by varying the annotated set of mask labels.

In an embodiment, the input image obtained from the database includes a human wearing an apparel in the foreground and a scene in the background.

In an embodiment, the system may be configured to detect a face region of the human in the input image, determine a top and torso location of the human in the input image with respect to the scene in the background, and generate a set of priors for creating the plurality of images.

In an embodiment, the system may be configured to randomize one or more parameters of the apparel in the input image, vary one or more parameters associated with the human in the input image, and vary placement of the foreground with respect to the background. In an embodiment, the image of the human with varying apparel is placed at different locations with respect to the scene in the background.

In another aspect, the present disclosure relates to a method for creating a multi attribute based data synthesis. The method, performed by one or more processors, includes obtaining an input image, where the input image includes a human wearing an apparel in a foreground and a scene in a background, detecting the human in the input image, detecting a face region of the human in the input image, generating a body-ratio-heuristics for the input image, where the body-ratio-heuristics includes predicting a position of torso, top, and bottom of the human in the input image with respect to the scene in the background, generating a set of mask labels associated with the input image, where the set of mask labels includes at least one of a sure foreground, a sure background, a probable foreground, and a probable background, and performing a domain randomization of the input image to generate a plurality of images to create the image database.

In an embodiment, the method includes randomizing one or more parameters of the apparel in the input image, varying one or more parameters associated with the human in the input image; and varying placement of the foreground with respect to the background.

In another aspect, the present disclosure relates to a user equipment (UE) for creating a multi attribute based data synthesis. The UE includes one or more processors and a memory operatively coupled to the one or more processors, where the memory includes processor-executable instructions, which on execution, cause the one or more processors to capture a set of images and transmit the set of images to a centralized system to create an image database for a fashion house, where the captured set of images includes an image of a human wearing an apparel placed in a background.

OBJECTS OF THE PRESENT DISCLOSURE

Some of the objects of the present disclosure, which at least one embodiment herein satisfies are as listed herein below.

It is an object of the present disclosure to provide for a novel synthetic data creation pipeline to solve data scarcity problem.

It is an object of the present disclosure to provide for a system that uses only a handful of labelled samples to synthesize millions of realistic data samples with cloth type annotations.

It is an object of the present disclosure to provide for a system that boosts the accuracy of automatic cloth type identification artificial intelligence (AI) models.

It is an object of the present disclosure to provide for a system that segments human and cloth from a scene.

It is an object of the present disclosure to provide for a system that creates multiple variations of human, apparel and background scene.

It is an object of the present disclosure to provide for a system that replaces the traditional error-prone and slow workflow of cloth-type annotation involving specialized manual labour with a computer vision assisted workflow.

It is an object of the present disclosure to provide for a system that scales the annotation of cloth apparels in a fast, efficient manner with minimal supervision.

It is an object of the present disclosure to provide for a system that boosts the accuracy of automatic cloth type annotation models.

It is an object of the present disclosure to provide for a system that improves the robustness of automatic cloth type annotation models.

It is an object of the present disclosure to provide for a system that can aid in various kinds of AI models such as cloth type extraction, cloth measurements model, cloth generation models, and cloth fitting models based on body types.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
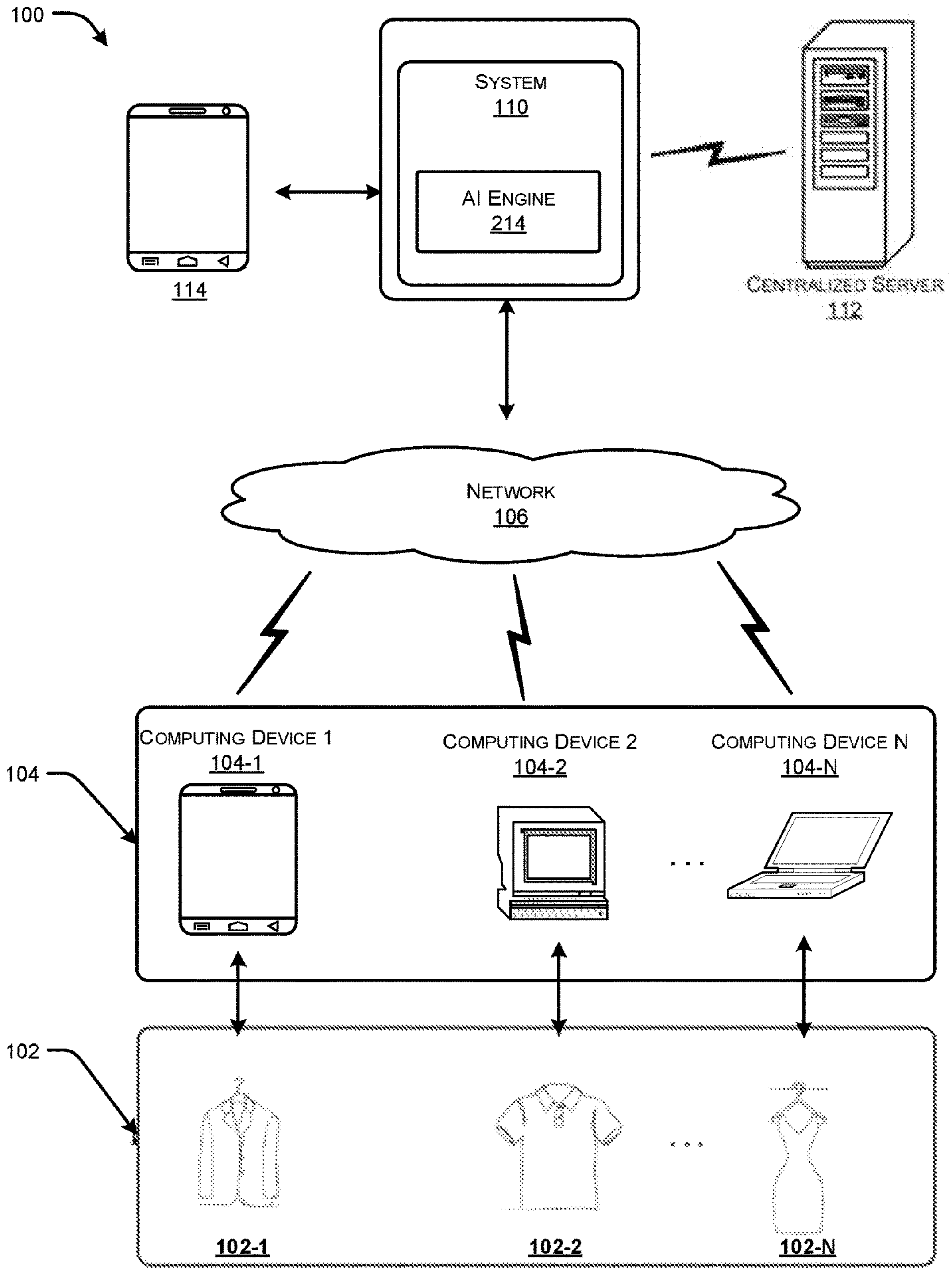
FIG. 1 illustrates an exemplary architecture (100) in which or with which a proposed system (110) may be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a robust and effective solution to an entity or an organization involved in the fashion filed, by enabling the entity to implement a system for creating a unique tag-type annotated image database from one or more labelled images. For example, without limitations, using only a handful of labelled samples, millions of realistic data samples are synthesized with cloth type annotations to boost the accuracy of automatic cloth type identification artificial intelligence (AI) models. The system can be configured to use one or more apparel images as an input and return a plurality of uniquely augmented variations of the images along with annotations based on the input.

In an embodiment, a novel synthetic data creation pipeline may be implemented to obtain the unique tag-type annotated image database. The pipeline includes a weakly supervised segmentation scheme for segmenting human and cloth from a given scenario, followed by a domain randomization process creating multiple variations of human, apparel and background scene for the prior segmented data. The data created by the proposed data creation framework helps improve the performance of the AI models by a significant margin.

FIG. 1 illustrates an exemplary network architecture (100) in which or with which a system (110) of the present disclosure may be implemented, in accordance with an embodiment of the present disclosure. As illustrated in FIG. 1, by way of example and not by not limitation, the exemplary architecture (100) may include a plurality of computing devices (104-1, 104-2 . . . 104-N). It may be appreciated that the plurality of computing devices (104-1, 104-2 . . . 104-N) may be collectively referred as the computing devices (104) and individually referred as the computing device (104).

In an embodiment, the plurality of computing devices (104) may be scanners such as cameras, webcams, scanning units, and the like configured to scan a plurality of images from a plurality of objects (102-1, 102-2 . . . 102-N) (also referred to as apparels herein). The plurality of computing devices (104) may also capture images of humans wearing an apparel and transmit the same to the system (110) via a network (106) for processing to create a unique tag-type annotated database. The system (110) may receive the plurality of images from a database associated with a centralised server (112) or any stand-alone database. The system (110) may extract a set of attributes from the plurality of images pertaining to, for example, facial and body features.

In an embodiment, the system (110) may be equipped with an artificial intelligence (AI) engine (214) that may train a fashion synthesis model based on the extracted set of attributes and data stored in the database to generate a plurality of priors for human body segmentation. In an embodiment, the AI engine (214) may be configured to employ one or more pre-trained fashion synthesis models to detect a person in each image as well as the face region of the person in any arbitrary pose in each image in the plurality of images received by the system (110).

In an embodiment, the one or more priors may pertain to a ratio of face versus the entire body. In another embodiment, the system (110) may generate a body-ratio-heuristic to predict a torso, top, and bottom of the human in each image. For example, using the prior information of face location and entire body location obtained from images of the person, the location of torso and top of the human body in the image using but not limited to a custom trained regression classifier that takes the face and whole-body bounding boxes as input and returns the torso and bottom ratio of the person in the image.

The system (110) may be configured to generate a mask based on the one or more priors detected. For example, using an approximate location of face, top, and torso, at least four regional priors convey the presence of human body by varying degree of certainty.

In an embodiment, the system (110) may be configured with a domain randomization module to create one or more apparels based on the mask generated. In an embodiment, the apparel may be based on adding novel textures to input human body with the image of the apparel.

In an embodiment, the domain randomization module may further include, but not limited to, a skin-type randomization module that can segment a skin region using skin colour values and add different skin colours to the skin-region.

In an embodiment, the domain randomization module may further include, but not limited to, a scene randomization that can place the human body with apparel in different background scenes at various locations inside the scene.

In an embodiment, the system (110) may be configured to provide flexibility to modify the preference parameters as per requirements at any stage of the project.

In an embodiment, the computing device (104) may communicate with the system (110) via set of executable instructions residing on any operating system. In an embodiment, the computing device (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) may not be restricted to the mentioned devices and various other devices may be used. A smart computing device may be one of the appropriate systems for storing data and other private/sensitive information.

In an embodiment, the network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (106) may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof. The network (106) may be a network within a fashion house.

In another embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
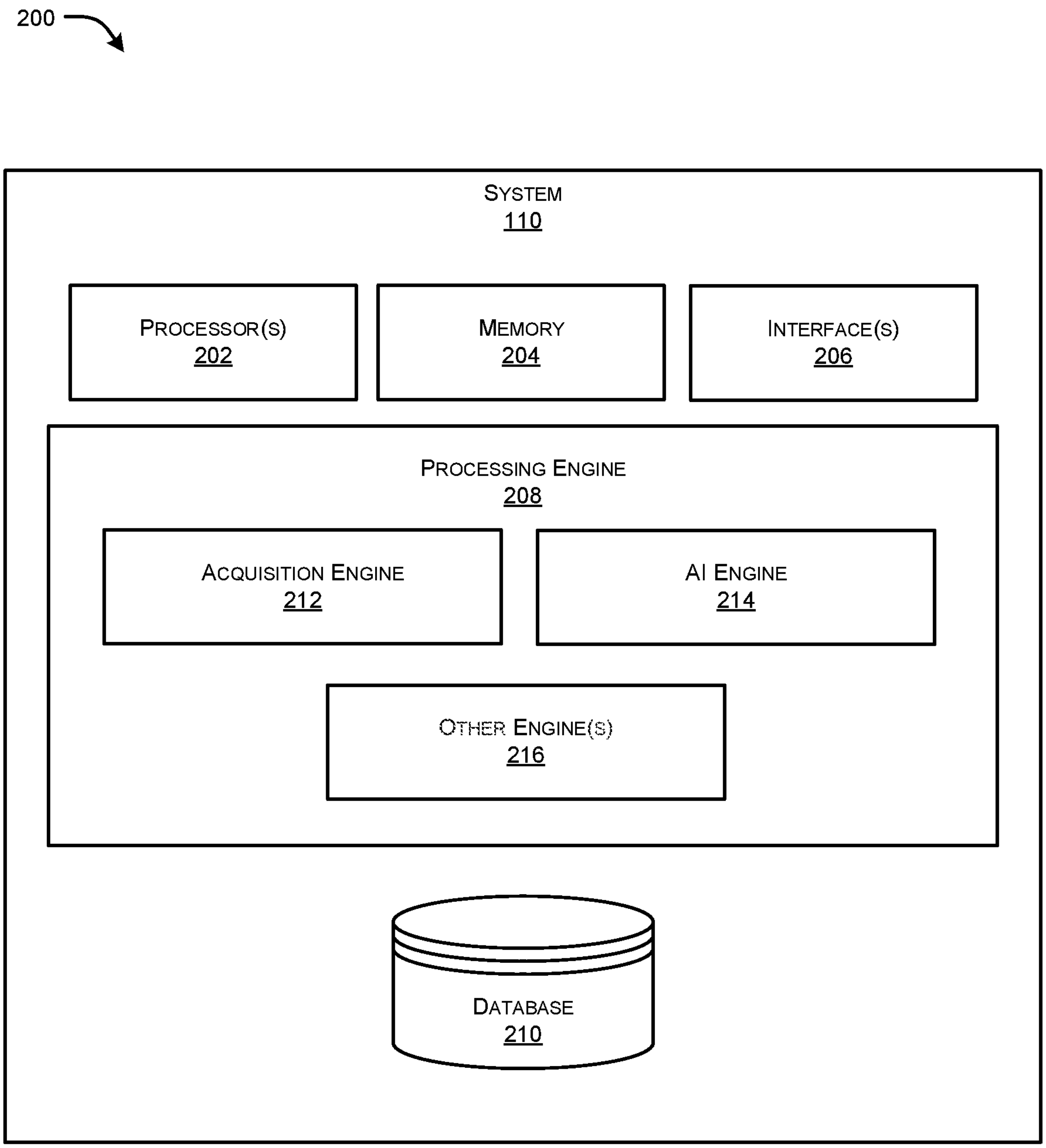
FIG. 2 illustrates an exemplary block diagram (200) of the system (110) for computer vision assisted fashion synthesis, in accordance with an embodiment of the present disclosure.

FIG. 2 illustrates an exemplary block diagram (200) of a system (110) for facilitating computer vision assisted workflow that enables scaling annotation of cloth apparels in a fast and efficient manner with minimal supervision based on an AI-based architecture, in accordance with an embodiment of the present disclosure.

In an embodiment, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) (206). The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing engine(s) (208) and a database (210).

Referring to FIG. 2, the database (210) may store the data, i.e., a set of data parameters associated with plurality of images pertaining to facial and body features of a human model who is shown as wearing the apparels or garments.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of a data acquisition engine (212), an AI engine (214), and other engines (216). It may be appreciated that the AI engine (214) of FIG. 2 may be similar to the AI engine (214) of FIG. 1 in its functionality.

In an embodiment, the one or more processor(s) (202) of the system (110) may cause the acquisition engine (212) to extract the set of data parameters from the database (210) for enabling prediction of data points by the AI engine (214) to generate multiple uniquely augmented variations of apparel images along with annotations based on a few sample input images provided by the database (210).

In an embodiment, the one or more processor(s) (202) may cause the AI engine (214) to pre-process the set of data parameters in one or more batches. As described with reference to FIG. 1 above, the AI engine (214) may utilise one or more machine learning models to pre-process the set of data parameters. In an embodiment, the AI engine (214) may perform pre-processing of the set of data parameters to form data in a proper time-series with equal intervals of time, for example, intervals of 1 minute. In an embodiment, results of the pre-processing or analysis may thereafter be transmitted back to the computing device (104), to other devices, to the server (112) providing a web page to a user (102) of the computing device (104), or to other non-device entities.

In an embodiment, based on the pre-processing, the one or more processor(s) (202) may cause the AI engine (214) to generate multiple uniquely augmented variations of apparel images along with annotations.

A person of ordinary skill in the art will appreciate that the exemplary representation (200) may be modular and flexible to accommodate any kind of changes in the system (110). In an embodiment, the data may get collected meticulously and deposited in a cloud-based data lake to be processed to extract actionable insights. Therefore, the aspect of predictive maintenance can be accomplished.

Figure 3:
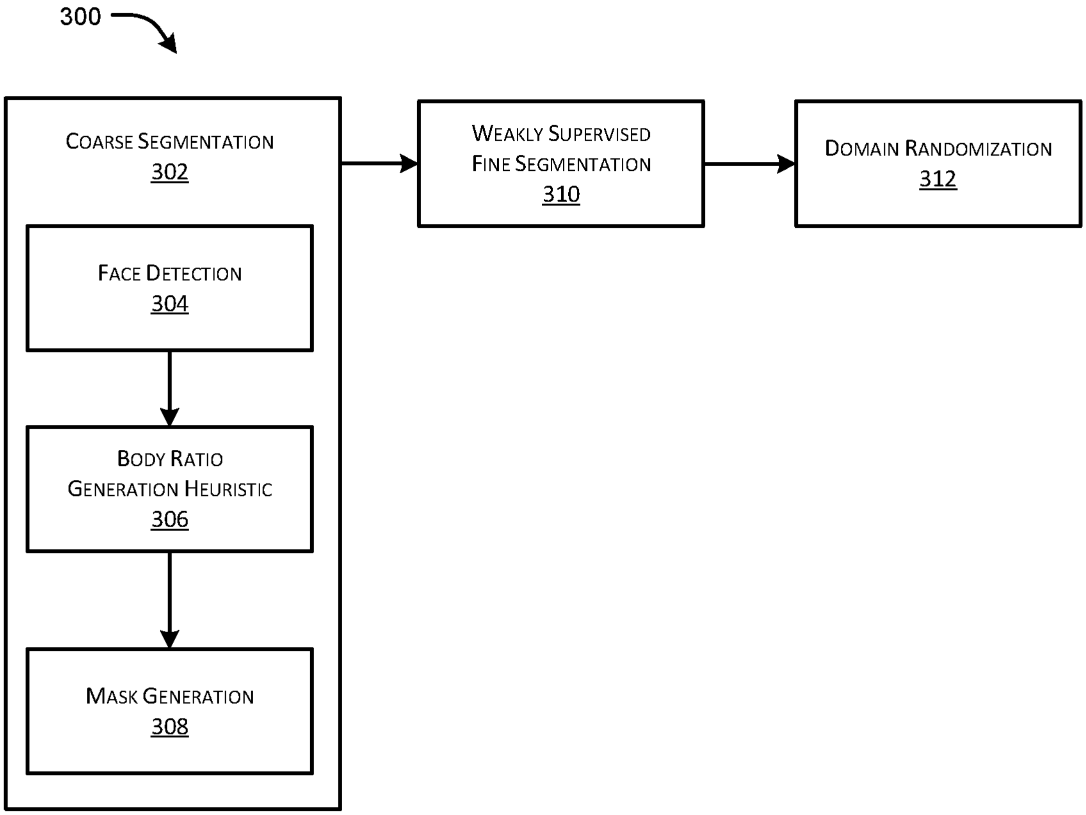
FIG. 3 illustrates an exemplary representation (300) of key components associated with the proposed system (110), in accordance with an embodiment of the present disclosure.

FIG. 3 illustrates an exemplary architecture (300) of key components associated with the proposed system (110), in accordance with embodiments of the present disclosure.

In FIG. 3, a coarse segmentation module (302), a face detection sub-module (304), a body-ratio-heuristic generation sub-module (306), a mask generation sub-module (308), a weakly supervised fine-segmentation module (310), and a domain randomization module (312) are shown. In an embodiment, the coarse segmentation module (302) may include one or more sub modules such as the face detection sub-module (304), the body-ratio-heuristic generation sub-module (306), and the mask generation sub-module (308) to generate a set of priors to be sent to the weakly supervised fine-segmentation module (310).

Referring to FIG. 3, the face detection sub-module (304) receives an input image of a human H posing in a scene wearing an apparel X and generates an output comprising a 2D bounding box of the face region of the human model H.

The body-ratio-heuristic generation sub-module (306) receives as input the image of a human H and the face-region bounding box generated by the face detection sub-module (304) and returns bounding box of approximate top and torso locations inside the scene.

The mask generation sub-module (308) creates at least four priors, based on the approximate location of face, top, and torso received from the face detection sub-module (304) and the body-ratio-heuristic generation sub-module (306), to be sent as input to the weakly supervised fine-segmentation module (310) namely:

Sure foreground

Sure background

Probable foreground

Probable background.

Referring to FIG. 3, the weakly supervised fine-segmentation module (310) seeds a set of instructions such as, but not limited to, a graph cut algorithm with automated mask priors obtained from the coarse segmentation module (302) and applies it on the input image, to obtain an approximate segmentation mask for the human model standing in the scene as well as the apparel worn by the model. A set of segmentation labels (a set of data points) may be associated with the segmentation mask. An annotator corrects the segmentation labels by clicking and adding dots to the foreground region and clicking and adding crosses to the background regions. The dots and crosses are visual labels that the annotator provides to the graph cut algorithm to re-segment the image. The re-segmented image is then provided as input to the domain randomization module (312).

The domain randomization module (312) may be configured to apply a plurality of texture, lighting, and colour variations on the apparel region using apparel masks to create new apparel data worn by the same model and place the segmented human model in multiple background scenes at distinct locations inside the scene. For example, without limitations, alpha-blending technique may be used to realistically blend the human model into the scene.

Figure 4:
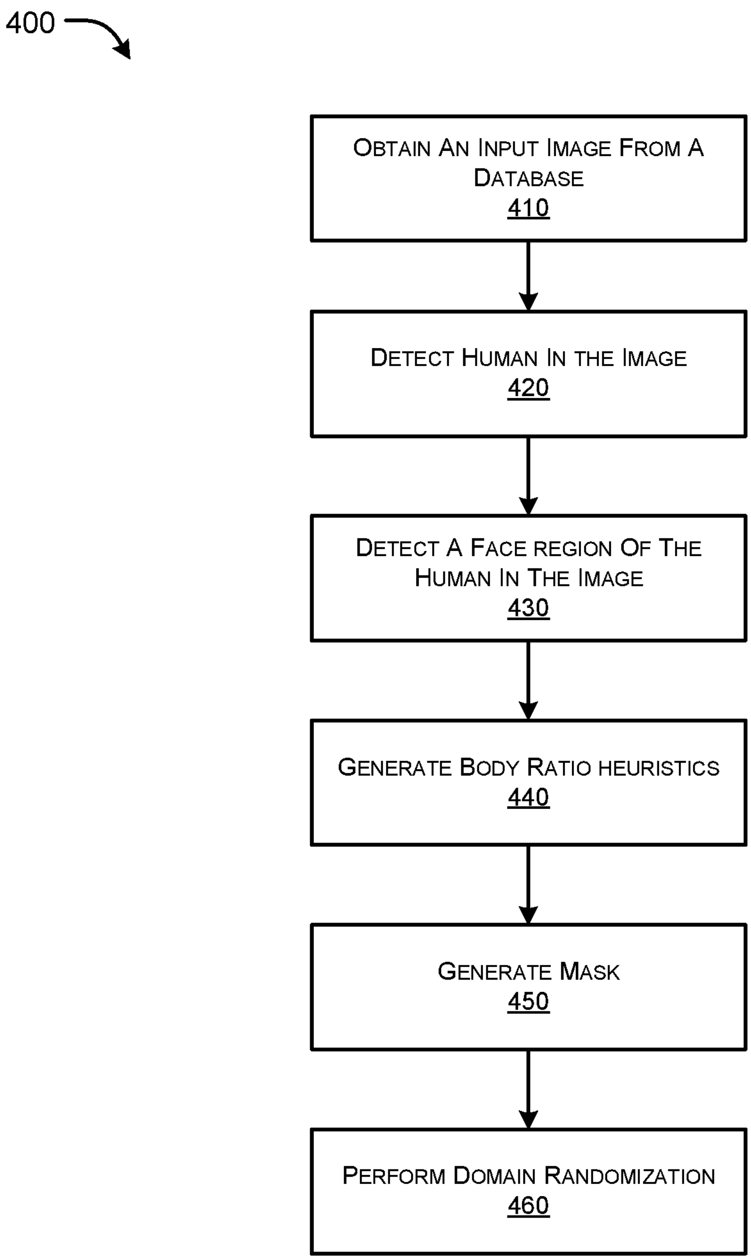
FIG. 4 illustrates an exemplary flow diagram of a method (500) for computer vision assisted fashion synthesis, in accordance with an embodiment of the present disclosure.

FIG. 4 illustrates a flow chart for a method (400) of creating a unique tag-type annotated image database from a few labelled images, in accordance with some embodiments of the present disclosure.

Referring to FIG. 4, the method (400) at step 410 includes obtaining, by a processor such as the processor (202) of FIG. 2, an input image from a database. The input image, for example, may be an image of a human H wearing an apparel X with some background scene. Upon obtaining the input image at step 410, the method (400) proceeds with detecting the human present in the image at step 420, followed by detecting a face region of the human in the image at step 430. The face region detection is performed by face detection sub-module (304) described in FIG. 3. Referring to FIG. 4, method (400), after the face detection of the human, body-ratio heuristics may be generated at step 440 followed by mask generation at step 450. The body-ratio-heuristic and the mask are generated by body-ratio-heuristic generation sub-module (306) and mask generation sub-module (308), as shown in FIG. 3, respectively.

Referring to step 440 of method (400), the body-ratio-heuristic is based on the prior information of face location and entire body location obtained from step 430, for example, a custom trained regression classifier that takes as input the face and whole-body bounding boxes and approximates the location of the torso and the top of the human body in the background scene and returns the torso and bottom ratio of the person in an image. At step 450, mask is generated based on the approximate location of face, top, and torso. The generated mask is associated with one or more regional priors that convey the presence of human body by varying degree of certainty. In an exemplary embodiment, four regional priors are used.

Referring to FIG. 4, at step 460, a domain randomization is performed based on the mask generated at step 450, wherein the domain randomization includes at least one of an apparel level randomization, skin-type randomization, and scene randomization. In the apparel level randomization process, novel apparels are synthesized by adding novel textures to input human body with apparel images. In skin-type randomization process, the skin region is segmented using skin colour values and different skin colours are added to the skin-region. In the scene randomization process, the human body with the synthesized apparel in shown placed in different background scenes at various locations inside the scene.

Figure 5:
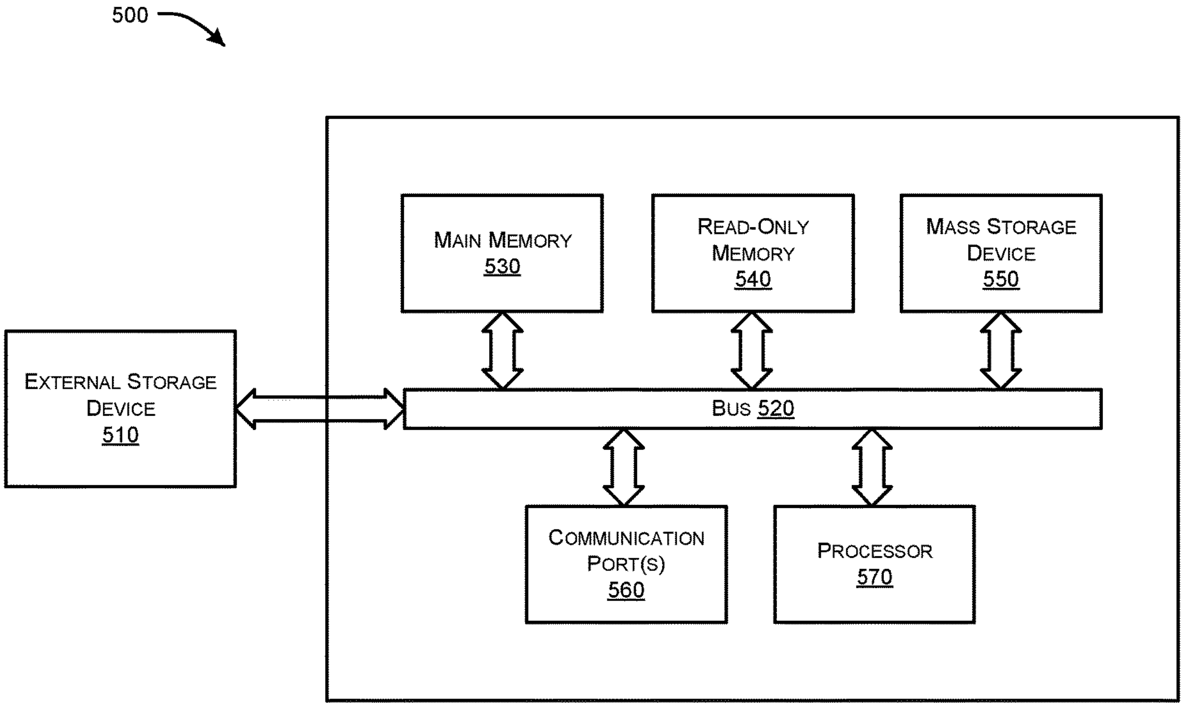
FIG. 5 illustrates an exemplary computer system (400) in which or with which embodiments of the present disclosure may be implemented.

FIG. 5 illustrates an exemplary computer system (500) in which or with which embodiments of the present invention can be utilized in accordance with embodiments of the present disclosure. As shown in FIG. 5, the computer system (500) may include an external storage device (510), a bus (520), a main memory (530), a read only memory (540), a mass storage device (550), communication port(s) (560), and a processor (570). A person skilled in the art will appreciate that the computer system (500) may include more than one processor (570) and communication port(s) (560). The processor (570) may include various modules associated with embodiments of the present disclosure. The communication port(s) (560) may be any of an RS-242 port for use with a modem based dialup connection, a 10/100 Ethernet port, a Gigabit or 10 Gigabit port using copper or fiber, a serial port, a parallel port, or other existing or future ports. The communication port(s) (560) may be chosen depending on a network, such a Local Area Network (LAN), Wide Area Network (WAN), or any network to which computer system connects. Memory 530 can be Random Access Memory (RAM), or any other dynamic storage device commonly known in the art. The read-only memory (530) may be any static storage device(s) e.g., but not limited to, a Programmable Read Only Memory (PROM) chips for storing static information e.g., start-up or BIOS instructions for the processor (570). The mass storage device (550) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage.

The bus (520) communicatively couples the processor (570) with the other memory, storage, and communication blocks. The bus (520) may be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects the processor (570) to the computer system (500).

Optionally, operator and administrative interfaces, e.g. a display, keyboard, and a cursor control device, may also be coupled to the bus (520) to support direct operator interaction with a computer system. Other operator and administrative interfaces may be provided through network connections connected through the communication port(s) (560). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, integrated circuit (IC) layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

Advantages of the Present Invention

The present disclosure provides a novel synthetic data creation pipeline to solve data scarcity problem.

The present disclosure provides a system that uses only a handful of labelled samples to synthesize millions of realistic data samples with cloth type annotations.

The present disclosure provides a system that boosts the accuracy of automatic cloth type identification artificial intelligence (AI) models.

The present disclosure provides a system that segments human and cloth from a scene.

The present disclosure provides a system that creates multiple variations of human, apparel, and background scene.

The present disclosure provides a system that replaces the traditional error-prone and slow workflow of cloth-type annotation involving specialized manual labour with a computer vision assisted workflow.

The present disclosure provides a system that scales the annotation of cloth apparels in a fast, efficient manner with minimal supervision.

The present disclosure provides a system that improves the robustness of automatic cloth type annotation models.

We claim:

1. A system for creating a multi-attribute-based data synthesis, said system comprising:
- one or more processors; and
- a memory operatively coupled to the one or more processors, wherein the memory comprises processor-executable instructions, which on execution, cause the one or more processors to:
  - obtain an input image from a database, wherein the image comprises a foreground and a background, and wherein the input image obtained from the database comprises an image of a human wearing an apparel in the foreground and a scene in the background;
  - perform a coarse segmentation of the input image to obtain a set of mask labels;
  - annotate the set of mask labels to differentiate the foreground from the background;
  - apply a weakly supervised fine-segmentation algorithm, wherein an annotator corrects segmentation labels by clicking and adding dots to the foreground and crosses to the background, and a graph cut algorithm utilizes the corrections to re-segment the image;
  - create a plurality of images by varying the annotated set of mask labels;
  - vary one or more parameters associated with the human in the input image; and
  - for each of the plurality of images, vary placement of the foreground with respect to the background, wherein the image of the human with varying apparel is placed at different, non-overlapping spatial locations within a single, fixed background scene.

2. The system as claimed in claim 1, wherein the memory comprises processor-executable instructions, which on execution, cause the one or more processors to:
- detect a face region of the human in the image;
- determine a top and torso location of the human in the image with respect to scene in the background; and
- generate a set of priors for creating the plurality of images.

3. The system as claimed in claim 1, wherein the memory comprises processor-executable instructions, which on execution, cause the one or more processors to:
- randomize one or more parameters of the apparel in the input image.

4. A method for creating a multi-attribute-based data synthesis, said method comprising:
- obtaining, by one or more processors, an input image from a database, wherein the input image obtained from the database comprises a human wearing an apparel in a foreground and a scene in a background;
- detecting, by the one or more processors, the human in the input image;
- detecting, by the one or more processors, a face region of the human in the input image;
- generating, by the one or more processors, a body-ratio-heuristics for the input image;
- generating, by the one or more processors, a set of mask labels associated with the input image;
- performing, by the one or more processors, a domain randomization of the input image to generate a plurality of images to create the image database;
- varying one or more parameters associated with the human in the input image; and
- for each of the plurality of images, varying placement of the foreground with respect to the background, wherein the image of the human with varying apparel is placed at different, non-overlapping spatial locations within a single, fixed background scene.

5. The method as claimed in claim 4, wherein generating, by the one or more processors, the body-ratio-heuristics comprises predicting, by the one or more processors, a position of torso, top, and bottom of the human in the input image with respect to the scene in the background.

6. The method as claimed in claim 4, wherein the set of mask labels comprise at least one of: a sure foreground, a sure background, a probable foreground, and a probable background.

7. The method as claimed in claim 4, comprising:
- randomizing one or more parameters of the apparel in the input image.

* * * * *